US012729412B2

(12) United States Patent
Terashima et al.

(10) Patent No.: US 12,729,412 B2
(45) Date of Patent: Sep. 8, 2026

(54) METHOD FOR MANUFACTURING GRAIN-ORIENTED ELECTRICAL STEEL SHEET

(71) Applicant: JFE STEEL CORPORATION, Tokyo (JP)

(72) Inventors: Takashi Terashima, Tokyo (JP); Takuya Yamada, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 394 days.

(21) Appl. No.: 18/561,448

(22) PCT Filed: May 24, 2022

(86) PCT No.: PCT/JP2022/021302

§ 371 (c)(1),
(2) Date: Nov. 16, 2023

(87) PCT Pub. No.: WO2022/250067

PCT Pub. Date: Dec. 1, 2022

(65) Prior Publication Data

US 2024/0271241 A1 Aug. 15, 2024

(30) Foreign Application Priority Data

May 26, 2021 (JP) ................................ 2021-088674

(51) Int. Cl.
*C21D 9/46* (2006.01)
*C21D 1/30* (2006.01)
(Continued)

(52) U.S. Cl.
CPC ................ *C21D 9/46* (2013.01); *C21D 1/30* (2013.01); *C21D 1/76* (2013.01); *C21D 6/002* (2013.01);
(Continued)

(58) Field of Classification Search
CPC ... C21D 9/46; C21D 1/30; C21D 1/76; C21D 6/002; C21D 6/005; C21D 6/008;
(Continued)

(56) References Cited

U.S. PATENT DOCUMENTS

| | | | |
|---|---|---|---|
| 2008/0190520 A1 | 8/2008 | Watanabe et al. |
| 2016/0111190 A1 | 4/2016 | Boettcher et al. |
| 2020/0063234 A1 | 2/2020 | Suehiro et al. |

FOREIGN PATENT DOCUMENTS

| | | |
|---|---|---|
| CN | 110651058 A | 1/2020 |
| JP | H0293021 A | 4/1990 |

(Continued)

OTHER PUBLICATIONS

Jul. 22, 2025, Office Action issued by the China National Intellectual Property Administration in the corresponding Chinese Patent Application No. 202280034358.9 with English language search report.

(Continued)

*Primary Examiner* — Ricardo D Morales
(74) *Attorney, Agent, or Firm* — KENJA IP LAW PC

(57) ABSTRACT

Provided is a method for manufacturing a grain-oriented electrical steel sheet with excellent uniformity of magnetic properties in the sheet transverse direction without increasing production costs. An ignition loss of an annealing separator after drying: IGLOSS (mass %), a storage time of a cold-rolled steel sheet: T (hr), and a carbon dioxide concentration in a storage environment of the cold-rolled steel sheet: A (mass ppm) satisfy the following formula (1):

$$A \times IGLOSS \leq -1500 \times \mathrm{Ln}(T) + 9000. \quad (1)$$

7 Claims, 1 Drawing Sheet

(51) Int. Cl.

| | |
|---|---|
| ***C21D 1/76*** | (2006.01) |
| ***C21D 6/00*** | (2006.01) |
| ***C21D 8/1216*** | (2026.01) |
| ***C21D 8/1244*** | (2026.01) |
| ***C21D 8/1277*** | (2026.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C22C 38/16*** | (2006.01) |
| ***C22C 38/34*** | (2006.01) |
| ***C22C 38/60*** | (2006.01) |
| ***H01F 1/147*** | (2006.01) |

(52) U.S. Cl.

CPC ............. *C21D 6/005* (2013.01); *C21D 6/008* (2013.01); *C21D 8/1222* (2013.01); *C21D 8/1233* (2013.01); *C21D 8/1255* (2013.01); *C21D 8/1261* (2013.01); *C21D 8/1283* (2013.01); *C22C 38/001* (2013.01); *C22C 38/002* (2013.01); *C22C 38/02* (2013.01); *C22C 38/04* (2013.01); *C22C 38/06* (2013.01); *C22C 38/16* (2013.01); *C22C 38/34* (2013.01); *C22C 38/60* (2013.01); *H01F 1/14775* (2013.01); *C21D 2201/05* (2013.01); *C22C 2202/02* (2013.01)

(58) Field of Classification Search

CPC .. C21D 8/1222; C21D 8/1233; C21D 8/1255; C21D 8/1261; C21D 8/1283; C21D 2201/05; C21D 1/26; C21D 3/04; C21D 8/1272; C22C 38/001; C22C 38/002; C22C 38/02; C22C 38/04; C22C 38/06; C22C 38/16; C22C 38/34; C22C 38/60; C22C 2202/02; H01F 1/14775; H01F 1/14783; H01F 1/147; Y02P 10/20

See application file for complete search history.

(56) References Cited

FOREIGN PATENT DOCUMENTS

| | | | | |
|---|---|---|---|---|
| JP | H07118755 | A | * | 5/1995 |
| JP | H07188755 | A | | 7/1995 |
| JP | H10158744 | A | | 6/1998 |
| JP | H11229036 | A | | 8/1999 |
| JP | 2007169755 | A | | 7/2007 |
| JP | 2007177298 | A | | 7/2007 |
| JP | 2016060953 | A | | 4/2016 |
| JP | 2017538859 | A | | 12/2017 |
| KR | 1020050005342 | A | | 1/2005 |
| WO | 2006051923 | A1 | | 5/2006 |

OTHER PUBLICATIONS

Dec. 19, 2023, Notification of Reasons for Refusal issued by the Japan Patent Office in the corresponding Japanese Patent Application No. 2022-571890 with English language concise statement of relevance.

Sep. 19, 2024, the Extended European Search Report issued by the European Patent Office in the corresponding European Patent Application No. 22811337.9.

May 21, 2024, Notification of Reasons for Refusal issued by the Japan Patent Office in the corresponding Japanese Patent Application No. 2022-571890 with English language concise statement of relevance.

Oct. 21, 2025, Office Action issued by the Korean Intellectual Property Office in the corresponding Korean Patent Application No. 10-2023-7040278 with English language concise statement of relevance.

Aug. 16, 2022, International Search Report issued in the International Patent Application No. PCT/JP2022/021302.

* cited by examiner

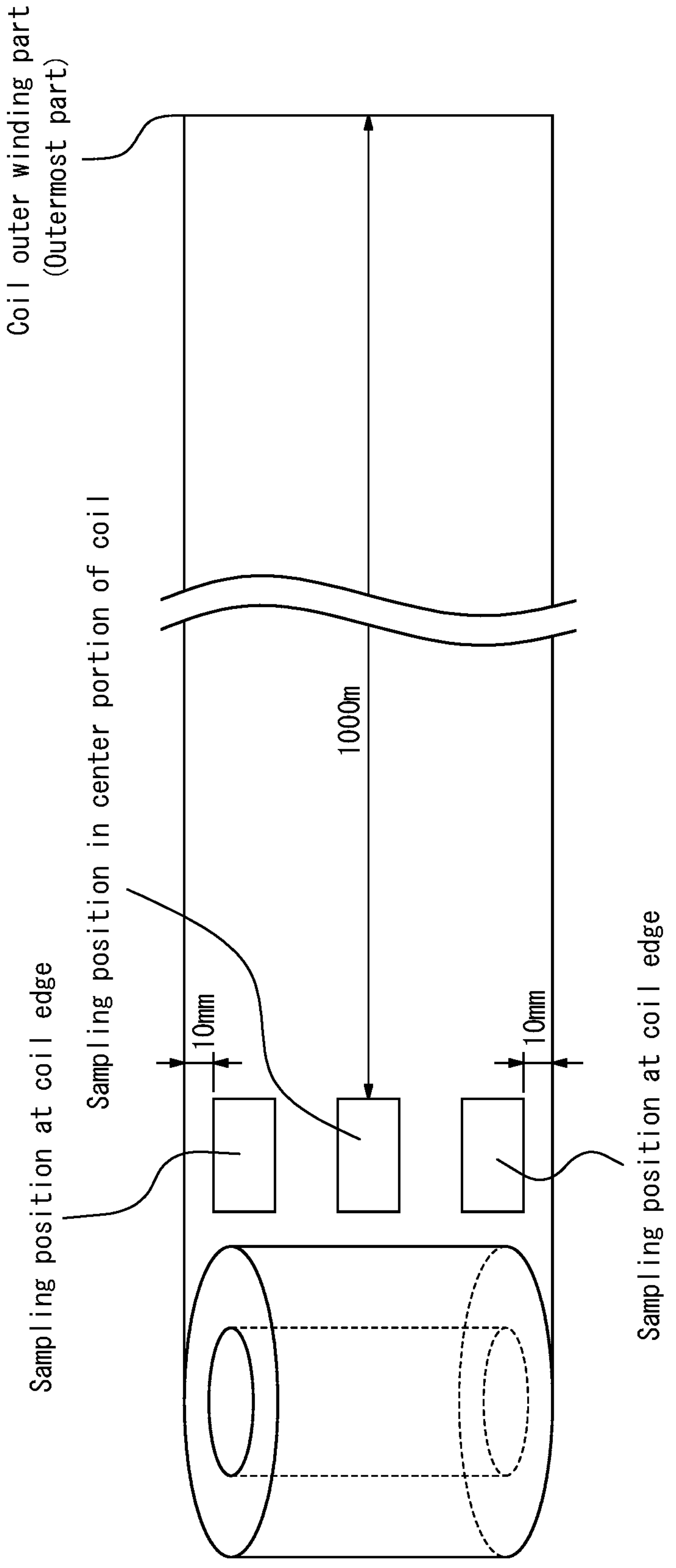
Coil outer winding part
(Outermost part)
1000m
Sampling position in center portion of coil
Sampling position at coil edge
10mm
10mm
Sampling position at coil edge

METHOD FOR MANUFACTURING GRAIN-ORIENTED ELECTRICAL STEEL SHEET

TECHNICAL FIELD

This disclosure relates to a method for manufacturing a grain-oriented electrical steel sheet.

BACKGROUND

A grain-oriented electrical steel sheet is generally manufactured by subjecting a steel slab with a predetermined chemical composition to hot rolling, annealing, and cold rolling and subsequently performing primary recrystallization annealing, decarburization annealing, and then final annealing. Of the above processes, the final annealing requires heat treatment at a high temperature of 1000° C. or higher. Therefore, in the final annealing, an annealing separator mainly consisting of magnesium oxide (hereinafter also referred to as MgO) powder is generally applied to the cold-rolled steel sheet surface to prevent coil burning.

In addition to its role in preventing burning, MgO also has the role of reacting with an oxidation layer mainly consisting of silica ($SiO_2$) (hereinafter referred to as $SiO_2$ oxidation layer) to form a forsterite film during the final annealing. Here, the $SiO_2$ oxidation layer is formed on the cold-rolled steel sheet surface during the decarburization annealing, which is performed before the final annealing. MgO also has the role of purifying the steel sheet by removing from it after the final annealing precipitates (e.g., a part of AlN, MnS, MnSe, $Si_3N_4$, TiN, TiC, and some others) that control the growth of iron crystal grains, called inhibitors.

By the way, carbon in steel, for example, is an essential element to improve the primary recrystallized texture. However, if a large amount of carbon remains in a final product, it may precipitate as carbides inside the steel sheet over time. The carbides then cause a problem that degrades magnetic properties, so-called magnetic aging.

For example, as a technique to solve such a problem, JPH02-93021A (PTL 1) describes "a method for manufacturing a grain-oriented silicon steel sheet with low deterioration of iron loss properties associated with stress relief annealing, comprising subjecting a hot-rolled sheet for grain-oriented silicon steel to cold rolling once or twice or more with intermediate annealing performed therebetween, followed by decarburization annealing, and then applying a MgO-based annealing separator containing Ti compounds, and subsequently performing final annealing, wherein a total carbon content in the steel and annealing separator of the steel sheet applied with the annealing separator immediately before the final annealing is 0.0015 wt % or less".

JP2007-169755A (PTL 2) describes "a method for manufacturing a grain-oriented electrical steel sheet coil, comprising subjecting a silicon steel slab containing 1.0 mass % to 5.0 mass % Si to hot rolling, followed by once or twice or more cold rolling including annealing treatment to a final sheet thickness, then performing primary recrystallization annealing, applying an annealing separator to a steel sheet surface and subsequently performing final annealing, wherein as the annealing separator, used is one which contains at least 50% magnesia as a main component and as a trace content, 1 to 10 parts by mass of titanic acid compounds having the composition below with respect to 100 parts by mass of the magnesia:

$$(M^{+}a, M^{2+}b, M^{3+}c)TixOy$$

where, $$0 \le a \le 4,\ 0 \le b \le 2,\ 0 \le c \le 2$$

$$1 \le x \le 4,\ 2 \le y \le 9$$

$M^+$: one selected from Li, Na, and K $M^{2+}$: one selected from Mg, Ca, Sr, Ba, Cr, Co, Mn, Zn, and Fe $M^{3+}$: one selected from Fe, Al, Cr, and Mn".

CITATION LIST

Patent Literature

PTL 1: JPH02-93021A

PTL 2: JP2007-169755A

SUMMARY

Technical Problem

However, the technique of PTL 1 does not sufficiently reduce the carbon content in the steel near the widthwise edge (hereinafter referred to as coil edge) of the coil-shaped steel sheet obtained after the final annealing, and thus does not sufficiently improve magnetic aging in the coil edge.

In addition, the technique of PTL 2 requires the use of Ti composite oxides with the special composition described above, which results in higher production costs.

It could thus be helpful to provide a method for manufacturing a grain-oriented electrical steel sheet, which stabilizes the carbon content at a low level at the coil edge after final annealing without causing an increase in production costs, thereby improving magnetic aging over the entire sheet transverse direction of the coil (hereinafter also referred to as "excellent uniformity of magnetic properties in the sheet transverse direction").

Solution to Problem

In order to achieve the above objective without increasing production costs, we made intensive studies from the viewpoint of devising production management.

As a result, we found that the reason why the technique of PTL 1 does not sufficiently reduce the carbon content in the steel at the coil edge is due to the carbonation of the annealing separator applied to the coil edge during the period between coiling of the steel sheet after the application of the annealing separator and the start of the final annealing, that is, the standby period in the coil yard, which results in carburization.

Based on the above finding, we further investigated and found that by satisfying the formula (1) below for an ignition loss of an annealing separator after drying: IGLOSS (mass %), a storage time of a cold-rolled steel sheet: T (hr), and a carbon dioxide concentration in a storage environment of the cold-rolled steel sheet: A (mass ppm), the carbon content at the coil edge after final annealing is stabilized at a low level, thereby improving the magnetic aging over the entire sheet transverse direction of the coil.

$$A \times IGLOSS \le -1500 \times \mathrm{Ln}(T) + 9000 \quad (1)$$

The present disclosure is based on these findings and further studies.

We thus provide the following.

1. A method for manufacturing a grain-oriented electrical steel sheet, comprising
   preparing a cold-rolled steel sheet having a chemical composition containing (consisting of) C: 0.0100 mass % or more and Si: 1.0 mass % or more,
   subjecting the cold-rolled steel sheet to decarburization annealing,
   applying a MgO-based annealing separator to a surface of the cold-rolled steel sheet and drying the annealing separator,
   coiling the cold-rolled steel sheet and then storing the cold-rolled steel sheet, and
   subjecting the cold-rolled steel sheet to final annealing,
   wherein an ignition loss of the annealing separator after drying: IGLOSS (mass %), a storage time of the cold-rolled steel sheet: T (hr), and a carbon dioxide concentration in a storage environment of the cold-rolled steel sheet: A (mass ppm) satisfy the following formula (1):

$$A \times IGLOSS \leq -1500 \times \mathrm{Ln}(T) + 9000. \quad (1)$$

Advantageous Effect

The present disclosure makes it possible to manufacture a grain-oriented electrical steel sheet with excellent uniformity of magnetic properties in the sheet transverse direction at low cost.

BRIEF DESCRIPTION OF THE DRAWINGS

In the accompanying drawing,

FIG. 1 is a schematic diagram illustrating sampling positions for evaluating magnetic aging.

DETAILED DESCRIPTION

The presently disclosed technique will be described below by way of embodiments.

The method for manufacturing a grain-oriented electrical steel sheet according to one of the disclosed embodiments comprises
- preparing a cold-rolled steel sheet having a chemical composition containing C: 0.0100 mass % or more and Si: 1.0 mass % or more (hereinafter also referred to as preparing step),
- subjecting the cold-rolled steel sheet to decarburization annealing (hereinafter also referred to as decarburization annealing step),
- applying a MgO-based annealing separator to a surface of the cold-rolled steel sheet and drying the annealing separator (hereinafter also referred to as applying and drying step),
- coiling the cold-rolled steel sheet and then storing the cold-rolled steel sheet (hereinafter also referred to as storing step), and
- subjecting the cold-rolled steel sheet to final annealing (hereinafter also referred to as final annealing step),
- wherein an ignition loss of the annealing separator after drying: IGLOSS (mass %), a storage time of the cold-rolled steel sheet: T (hr), and a carbon dioxide concentration in a storage environment of the cold-rolled steel sheet: A (mass ppm) satisfy the following formula (1):

$$A \times IGLOSS \leq -1500 \times \mathrm{Ln}(T) + 9000. \quad (1)$$

The following describes each of the steps.

[Preparing Step]

First, prepared is a cold-rolled steel sheet having a chemical composition containing C: 0.0100 mass % or more and Si: 1.0 mass % or more.

Here, the method for preparing the cold-rolled steel sheet is not particularly limited. For example, a steel slab having a chemical composition containing C: 0.0100 mass % or more and Si: 1.0 mass % or more is hot rolled to obtain a hot-rolled steel sheet. The hot-rolled steel sheet is subjected to hot-rolled sheet annealing as necessary, followed by cold rolling once, or twice or more with intermediate annealing performed therebetween to obtain a cold-rolled sheet. The cold-rolled steel sheet having the above chemical composition can thus be prepared.

The conditions for hot rolling, hot-rolled sheet annealing, intermediate annealing, and cold rolling are not limited, and may comply with conventional methods.

The reasons for the limitation of chemical composition for the cold-rolled steel sheet to be prepared are as follows.

C: 0.0100 Mass % or More

C is a useful component for the generation of Goss-oriented crystal grains. In order to achieve this effect effectively, the C content should be 0.0100 mass % or more. On the other hand, too much C may cause poor decarburization even if decarburization annealing is performed. Therefore, a C content of 0.1000 mass % or less is preferred.

Si: 1.0 Mass % or More

Si is an element that increases electrical resistance to decrease iron loss. Si is also an element that stabilizes the BCC structure of iron to enable heat treatment at high temperatures. Therefore, the Si content should be 1.0 mass % or more. A Si content of 2.0 mass % or more is preferred. On the other hand, too much Si may make cold rolling difficult. Therefore, a Si content of 5.0 mass % or less is preferred.

In addition to the above elements, the chemical composition of the cold-rolled steel sheet to be prepared optionally also contains, in mass %, one from (a) through (d) or several from (a) through (d) in combination:

(a) Mn: 0.01% or more and 1.0% or less;
(b) sol.Al: 0.003% or more and 0.050% or less;
(c) N: 0.001% or more and 0.020% or less; and
(d) at least one selected from the group consisting of S: 0.001% or more and 0.05% or less and Se: 0.001% or more and 0.05% or less.

Mn effectively improves the hot brittleness of steel. Mn also functions as an inhibitor by forming precipitates with S and Se such as MnS and MnSe. From the viewpoint of obtaining this effect sufficiently, a Mn content of 0.01 mass % or more is preferred. On the other hand, too much Mn coarsens the grain sizes of precipitates such as MnSe. This may result in loss of effect as an inhibitor. Therefore, the Mn content is preferably 1.0 mass % or less.

Sol.Al is a useful component that forms AlN in steel and acts as an inhibitor as a dispersed second phase. If too little Al is present, the amount of AlN precipitation may not be sufficient. On the other hand, too much Al may cause coarse precipitation of AlN and loss of its action as an inhibitor.

Therefore, the sol. Al content is preferably 0.003 mass % or more. The sol. Al content is preferably 0.050 mass % or less.

N is a component to form AlN as well as Al. Too little N may result in insufficient AlN precipitation. On the other hand, too much N may cause blistering and the like during slab heating. For this reason, the N content is preferably 0.001 mass % or more. The N content is preferably 0.020 mass % or less.

Both S and Se are useful components that exert inhibitor effects. In detail, S and Se combine with Mn and Cu to form compounds such as MnSe, MnS, $Cu_{2-x}Se$, and $Cu_{2-x}S$. These compounds then exert inhibitor effects as a dispersed second phase in the steel. If S and Se are too little, their addition effects may be insufficient. On the other hand, too much S and Se may result in incomplete solute during slab heating. It may also cause defects on the product surface. Therefore, the S and Se contents are preferably 0.001 mass % or more. The S and Se contents are preferably 0.05 mass % or less.

In addition to the above elements, the chemical composition of the cold-rolled steel sheet to be prepared optionally can also contain, in mass %, at least one selected from the group consisting of Cu: 0.01% or more and 0.2% or less, Ni: 0.01% or more and 0.5% or less, Cr: 0.01% or more and 0.5% or less, Sb: 0.01% or more and 0.1% or less, Sn: 0.01% or more and 0.5% or less, Mo: 0.01% or more and 0.5% or less, and Bi: 0.001% or more and 0.1% or less.

Cu, Ni, Cr, Sb, Sn, Mo and Bi are all elements that act as auxiliary inhibitors and improve magnetic properties. When the content of each of the elements is less than the amount of the corresponding element listed above, it is difficult to obtain the effect. On the other hand, when the content of each of the elements exceeds the amount of the corresponding element listed above, poor coating appearance and secondary recrystallization failure may easily occur. Therefore, the contents of these elements should be within the above ranges.

In addition to the above elements, the chemical composition of the cold-rolled steel sheet to be prepared can optionally also contain, in mass %, at least one element selected from the group consisting of B: 0.001% or more and 0.01% or less, Ge: 0.001% or more and 0.1% or less, As: 0.005% or more and 0.1% or less, P: 0.005% or more and 0.1% or less, Te: 0.005% or more and 0.1% or less, Nb: 0.005% or more and 0.1% or less, Ti: 0.005% or more and 0.1% or less, and V: 0.005% or more and 0.1% or less.

This results in a stronger inhibiting capability and a higher magnetic flux density consistently.

The balance of the chemical composition of the cold-rolled steel sheet to be prepared, other than the above elements, is Fe and inevitable impurities. If the content of each of the above optional additive elements is less than the lower limit, the optional additive element shall be included as the inevitable impurity.

The thickness of the cold-rolled steel sheet to be prepared is not particularly limited, but a thickness of 0.14 mm or more is preferable. A thickness of 0.50 mm or less is preferable. The sheet width (width in the direction orthogonal to the rolling direction) of the cold-rolled steel sheet to be prepared is not particularly limited, but a width of 900 mm or more is preferable. A width of 1500 mm or less is preferable. The same applies to the optimal ranges of thickness and width of the coiled cold-rolled steel sheet.

[Decarburization Annealing Step]

Then, the cold-rolled steel sheet prepared in the above preparing step is subjected to decarburization annealing. The conditions for decarburization annealing are not particularly limited and conventional methods can be used. For example, the atmosphere in decarburization annealing is preferably a humid hydrogen atmosphere from the viewpoint of reliable decarburization and formation of a $SiO_2$ oxidation layer. As described above, the $SiO_2$ oxidation layer reacts with MgO in the annealing separator to form a forsterite film during the final annealing.

Here, the humid hydrogen atmosphere is an atmosphere with a hydrogen concentration of 50 vol % or more and a dew point of 40° C. or higher and 65° C. or lower. The decarburization annealing temperature is preferably 800° C. or higher. The decarburization annealing temperature is preferably 900° C. or lower. By setting the hydrogen concentration in the humid hydrogen atmosphere to 50 vol % or more, the decarburization rate and oxidation rate can be controlled in a stable manner. If the decarburization annealing temperature or the dew point is too low, decarburization failure may occur. On the other hand, if the decarburization annealing temperature or the dew point is too high, an internal oxidation layer may be formed excessively, resulting in product defects. In the humid hydrogen atmosphere, the balance other than hydrogen is not particularly limited, and examples thereof include neutral gases such as nitrogen and argon. It is particularly suitable that the balance other than hydrogen in the humid hydrogen atmosphere be nitrogen (i.e., a mixed atmosphere of hydrogen and nitrogen is employed as the humid hydrogen atmosphere).

Although the decarburization annealing generally also serves as primary recrystallization annealing, the decarburization annealing and primary recrystallization annealing may be performed separately. Conditions other than the above are not particularly limited and conventional methods can be used. For example, an annealing time of 30 seconds or more is preferable. An annealing time of 180 seconds or less is preferable.

[Applying and Drying Step]

Then, the MgO-based annealing separator is applied to a surface of the cold-rolled steel sheet that has undergone the above decarburization annealing step and dried.

For example, the MgO-based annealing separator is made into water slurry and applied to the cold-rolled steel sheet surface using a roll coater. In this case, the slurry temperature is preferably controlled within a certain range (±5°). Since controlling the slurry temperature at a temperature that deviates too much from room temperature wastes energy, the median value of slurry temperature control is preferably 5° C. or higher. The median value of slurry temperature control is preferably 30° C. or lower. Then, the cold-rolled steel sheet applied with the MgO-based annealing separator is dried by means of an infrared heating furnace or a hot air oven to remove excess water in the annealing separator. The final attained sheet temperature (hereafter also referred to as drying temperature) is preferably 350° C. or higher. This allows magnesium hydroxide ($Mg(OH)_2$) produced by the hydration reaction to be converted back to MgO. The MgO produced in this process is highly reactive, so the forsterite film formed during final annealing is also in good condition.

Here, "MgO-based" means that the MgO content of the annealing separator is 50 mass % or more. If the MgO content is less than 50 mass %, the formation amount of forsterite film is insufficient. The MgO content of the annealing separator is preferably 60 mass % or more, more preferably 80 mass % or more.

The balance other than MgO in the annealing separator includes, for example, $TiO_2$ and sulfides, sulfates, oxides, and hydroxides of alkaline earth metals.

Conditions other than the above are not particularly limited and conventional methods can be used. For example, the coating amount of the annealing separator is preferably 2.5 $g/m^2$ or more per side of the steel sheet after drying. The coating amount of the annealing separator is preferably 10 $g/m^2$ or less. The drying time is preferably 1 minute or more. The drying time is preferably 5 minutes or less.

[Storing Step]

Then, the cold-rolled steel sheet that has undergone the above applying and drying step is coiled and stored. In general, the cold-rolled steel sheet is stored in a coil yard.

In the method for manufacturing a grain-oriented electrical steel sheet according to one of the disclosed embodiments, it is extremely important that in the storing step, the ignition loss of the annealing separator after drying: IGLOSS (mass %), storage time of the cold-rolled steel sheet: T (hr), and carbon dioxide concentration in the storage environment of the cold-rolled steel sheet: A (mass ppm) satisfy the following formula (1):

$$A \times IGLOSS \leq -1500 \times \mathrm{Ln}(T) + 9000 \quad (1)$$

where, Ln means the natural logarithm.

In detail, to reduce the carbon concentration in the final product of grain-oriented electrical steel sheet, especially to less than 40 mass ppm, it is important to (1) remove carbon sufficiently from the steel sheet during decarburization annealing;

(2) lower the carbon concentration in the annealing separator; and (3) inhibit carbonation by $CO_2$ in the atmosphere during standby in the coil yard.

The conditions for this storing step are closely related to "(3) inhibit carbonation by $CO_2$ in the atmosphere during standby in the coil yard".

In detail, the mechanism of carbonation during standby in the coil yard in (3) could be the formation of basic magnesium carbonate by carbonation of magnesium hydroxide ($Mg(OH)_2$), as in the following reaction formula:

$$(m+1)\ Mg(OH)_2 + mCO_2 \longrightarrow mMgCO_3 \cdot Mg(OH)_2 \cdot mH_2O \quad (2)$$

where, m is an integer from 3 to 5.

The above-mentioned PTL 2 provides that it is difficult to control the standby time in the coil yard, which corresponds to the reaction time of the chemical reaction of the above reaction equation, because the operating conditions of the final annealing line are not stable. It also states that controlling $CO_2$ concentration and humidity in the air is impractical because of the enormous costs involved.

By the way, $Mg(OH)_2$ on the left-hand side of the formula (2) above is produced by a series of processes in which the MgO-based annealing separator is applied as a water slurry to the steel sheet surface and then dried. The content of $Mg(OH)_2$ in the annealing separator after drying is then considered to be measurable as ignition loss (IGLOSS) as specified in JIS K 0067:1992.

Here, JIS K 0067:1992 specifies the ignition temperature as 650° C.±50° C. However, it has been revealed that: when the ignition loss of the annealing separator after drying is measured at an ignition temperature of 650° C.±50° C., the ignition loss includes not only the loss on $Mg(OH)_2$ but also the loss on $MgCO_3$.

We further investigated and made the following findings.

To accurately measure the loss of $Mg(OH)_2$, it is necessary to measure the ignition loss of the annealing separator after drying at ignition temperature: 500° C.±10° C. and soaking time: 30 minutes.

By satisfying the formula (1) below for an ignition loss of the annealing separator after drying measured under these conditions: IGLOSS (mass %), storage time of the cold-rolled steel sheet: T (hr), and carbon dioxide concentration in the storage environment of the cold-rolled steel sheet: A (mass ppm), carbonation of the annealing separator applied to the coil edge, and consequently carburizing of the coil edge, is suppressed. As a result, it is possible to manufacture a grain-oriented electrical steel sheet with excellent uniformity of magnetic properties in the sheet transverse direction.

Here, the ignition loss of annealing separator after drying: IGLOSS (mass %) is measured as follows.

In detail, 2 g of the annealing separator after drying is sampled in powder form from the surface of the cold-rolled steel sheet that has undergone the above applying and drying step. Using the sampled annealing separator after drying as a sample, the weight loss (the amount of decrease in mass when the sample is ignited) is measured by the method in accordance with JIS K 0067: 1992, under the conditions of ignition temperature: 500° C. and soaking temperature: 30 minutes. The measured weight loss, expressed as mass percentage, is then the ignition loss of the annealing separator after drying: IGLOSS (mass %).

The storage time of cold-rolled steel sheet: T (hr) is the time from the point in time when coiling of the cold-rolled steel sheet is completed to the final annealing start time.

The point in time when coiling of the cold-rolled steel sheet is completed is defined as the point in time when the continuous steel sheet is coiled, then the steel sheet is sheared and separated as a coil. The final annealing start time is defined as the time when the coil is placed on the coil receiving table of a final annealing furnace.

In addition, the carbon dioxide concentration in the storage environment of the cold-rolled steel sheet: A (mass ppm) is measured as follows.

In detail, when the cold-rolled steel sheet is stored, the carbon dioxide concentration in the atmosphere is measured at 0 minutes every hour in Coordinated Universal Time (UTC). The arithmetic mean of the carbon dioxide concentration in the atmosphere at 0 minutes every hour of Coordinated Universal Time (UTC) measured during the storage of the cold-rolled steel sheet is used as the carbon dioxide concentration in the storage environment of the cold-rolled steel sheet: A.

In satisfying the above formula (1), it is effective to reduce IGLOSS by setting the drying temperature of the annealing separator to 400° C. or higher or by extending the drying time, if it is known in advance that T will be prolonged due to production line maintenance, for example. In this case, the amount of magnesium hydroxide ($Mg(OH)_2$) that once formed returns to magnesium oxide (MgO) increases, which is desirable because the appearance of the forsterite film after final annealing becomes uniform.

In addition, if T becomes longer unexpectedly due to production line trouble or other reasons, it is necessary to reduce the carbon dioxide concentration in the storage environment of the cold-rolled steel sheet. Such methods include, for example, covering the coil with a vinyl cover and purging it with nitrogen by supplying liquid nitrogen inside the cover.

No limit is placed as long as the above formula (1) is satisfied. However, the following is usually preferable. IGLOSS is preferably 1.5 mass % or more. IGLOSS is preferably 5.0 mass % or less. The storage time of the cold-rolled steel sheet: T is preferably 4 hr or more. The storage time of the cold-rolled steel sheet: T is preferably 240 hr or less. The carbon dioxide concentration in the storage environment of the cold-rolled steel sheet: A is preferably 200 mass ppm or more. The carbon dioxide concentration in the storage environment of the cold-rolled steel sheet: A is preferably 800 mass ppm or less.

Conditions other than the above are not limited, and conventional method should be used.

[Final Annealing Step]

Then, the cold-rolled steel sheet that has undergone the above storing step is subjected to final annealing. The conditions for final annealing are not limited, and conventional method should be used. For example, an annealing temperature of 1100° C. or higher is preferable. An annealing temperature of 1250° C. or lower is preferable. An annealing time of 5 hours or more is preferable. An annealing time of 20 hours or less is preferable.

Flattening annealing may optionally be performed after the final annealing. The conditions for flattening annealing are not limited, and conventional method should be used.

EXAMPLES

Example 1

A steel slab containing, in mass %, C: 0.0400%, Si: 3.25%, Mn: 0.08%, S: 0.002%, sol. Al: 0.015%, N: 0.006%, Cu: 0.05%, and Sb: 0.01%, with the balance being Fe and inevitable impurities, was heated at a slab heating temperature of 1150° C. and a holding time of 20 minutes. The steel slab was then hot rolled to obtain hot-rolled steel sheets with a sheet thickness of 2.4 mm. The resulting hot-rolled steel sheets were then subjected to hot-rolled sheet annealing at an annealing temperature of 1000° C. and an annealing time of 60 seconds (1 minute). Then, the hot-rolled steel sheets were cold rolled to obtain cold-rolled steel sheets with a sheet thickness (final sheet thickness) of 0.27 mm. The chemical composition of the prepared cold-rolled steel sheets was the same as that of the steel slab above.

The prepared cold-rolled steel sheets were subjected to decarburization annealing, which also serves as primary recrystallization annealing, under a wet hydrogen atmosphere of 50 vol % hydrogen-50 vol % nitrogen and a dew point of 50° C., with an annealing temperature of 820° C. and an annealing time of 60 seconds. The average heating rate from room temperature to 820° C. was 100° C./s. The carbon content of the steel substrate of each of the cold-rolled steel sheets after decarburization annealing was 5 mass ppm.

Then, a MgO-based annealing separator, specifically, obtained by mixing 5 parts by mass of $TiO_2$ with respect to 100 parts by mass of MgO, was made into a water slurry and hydrated at 15° C. for 2.0 hours. Then, the annealing separator was applied to each of the cold-rolled steel sheets after decarburization annealing, so that the coating amount of the annealing separator was 6.5 g/$m^2$ per side of the steel sheet after drying. The annealing separator was then dried with a drying temperature of 350° C. and drying time of 1 minute.

The cold-rolled steel sheets were then coiled and stored for a certain period of time under the conditions listed in Table 1. The value of the ignition loss of the annealing separator after drying: IGLOSS (mass %) was measured by the method described above to be 3.0 mass %. The carbon dioxide concentration in the storage environment of the cold-rolled steel sheet: A was controlled by the method described above.

The cold-rolled steel sheets were then subjected to final annealing with an annealing temperature of 1200° C. and an annealing time of 5 hours. The heating time from 300° ° C. to 800° C. was 100 hours, and the average heating rate from 800° ° C. to 1200° ° C. was 50° C./hr. After the final annealing, unreacted annealing separator was removed with a brush. The cold-rolled steel sheets were then subjected to flattening annealing in a non-oxidizing atmosphere containing 98 vol % nitrogen with the balance being hydrogen with an annealing temperature of 800° C. and an annealing time of 30 seconds to obtain grain-oriented electrical steel sheets as the final product.

The magnetic aging of each of the resulting grain-oriented electrical steel sheets was then evaluated.

In detail, as illustrated in FIG. 1, at the position 1000 m inward from the coil outer winding part of the obtained grain-oriented electrical steel sheet toward the center portion of the coil (unwinding the coil, the position 1000 m inward from the outermost part), samples of length: 300×width (in sheet transverse direction): 100 mm were taken from the center portion (center portion in the sheet transverse direction) of the coil and from the coil edge, respectively. For the sample taken from the center portion of the coil (center portion in the sheet transverse direction), the center position in the sheet transverse direction was located at the center position in the sheet transverse direction of the coil. For the sample taken from the coil edge, the center position in the sheet transverse direction was located at 60 mm from the edge in the sheet transverse direction of the coil (i.e., the area up to 10 mm from the edge in the sheet transverse direction shall be cut off).

The iron loss values ($W_{17/50}$) of the samples taken from the center portion (center portion in the sheet transverse direction) of the coil and from the coil edge were then measured. The measurement results are also listed in Table 1. The $W_{17/50}$ values of the samples taken from the center portion (center portion in the sheet transverse direction) of the coil (before stress relief annealing) and from the coil edge were all in the range of 0.88 to 0.93 W/kg. The B& values of the samples taken from the center portion (center portion in the sheet transverse direction) of the coil (before stress relief annealing) and from the coil edge were all in the range of 1.895 to 1.905 T.

The samples were then subjected to stress relief annealing in a nitrogen atmosphere with an annealing temperature of 800° C. and an annealing time of 3 hours. The iron loss and carbon content of the steel substrate were then measured for each of the samples after stress relief annealing. Further, for each of the samples taken from the center portion (center portion in the sheet transverse direction) of the coil and from the coil edge, a ratio of the iron loss after the stress relief annealing to the iron loss before the stress relief annealing (=[iron loss measured in the sample after stress relief annealing]/[iron loss measured in the sample before stress relief annealing]) was calculated, and the uniformity of magnetic properties in the sheet transverse direction was evaluated according to the following criteria.

Pass (Excellent): the ratio of iron loss after stress relief annealing to iron loss before stress relief annealing is 1.05 or less for both samples taken from the center portion (center portion in the sheet transverse direction) of the coil and from the coil edge.

Failed: the ratio of iron loss after stress relief annealing to iron loss before stress relief annealing exceeds 1.05 in at least one of the samples taken from the center portion (center portion in the sheet transverse direction) of the coil and from the coil edge.

The results are also listed in Table 1.

TABLE 1

| | Storing Conditions | | | | | Before Stress Relief Annealing Iron loss (W/kg) | | After Stress Relief Annealing Carbon content (mass ppm) | | After Stress Relief Annealing Iron loss (W/kg) | | Ratio of Iron Loss | | |
|---|---|---|---|---|---|---|---|---|---|---|---|---|---|---|
| No. | A (mass ppm) | T (hr) | A × IGLOSS | −1500 × Ln(T) + 9000 | Formula (1)* | Center portion | Edge | Center portion | Edge | Center portion | Edge | Center portion | Edge | Remarks |
| 1 | 200 | 264 | 600 | 636 | ○ | 0.90 | 0.90 | 6 | 20 | 0.90 | 0.91 | 1.00 | 1.01 | Example |
| 2 | 300 | 216 | 900 | 937 | ○ | 0.91 | 0.91 | 6 | 20 | 0.91 | 0.92 | 1.00 | 1.01 | Example |
| 3 | 500 | 144 | 1500 | 1545 | ○ | 0.92 | 0.92 | 6 | 19 | 0.92 | 0.93 | 1.00 | 1.01 | Example |
| 4 | 1000 | 48 | 3000 | 3193 | ○ | 0.88 | 0.88 | 6 | 15 | 0.88 | 0.90 | 1.00 | 1.02 | Example |
| 5 | 800 | 72 | 2400 | 2585 | ○ | 0.90 | 0.90 | 6 | 16 | 0.90 | 0.92 | 1.00 | 1.02 | Example |
| 6 | 700 | 96 | 2100 | 2153 | ○ | 0.89 | 0.89 | 6 | 19 | 0.89 | 0.91 | 1.00 | 1.02 | Example |
| 7 | 1200 | 36 | 3600 | 3625 | ○ | 0.90 | 0.90 | 7 | 21 | 0.90 | 0.90 | 1.00 | 1.00 | Example |
| 8 | 100 | 312 | 300 | 385 | ○ | 0.92 | 0.92 | 6 | 17 | 0.92 | 0.92 | 1.00 | 1.00 | Example |
| 9 | 150 | 200 | 450 | 1053 | ○ | 0.93 | 0.93 | 6 | 13 | 0.93 | 0.94 | 1.00 | 1.01 | Example |
| 10 | 50 | 250 | 150 | 718 | ○ | 0.90 | 0.90 | 6 | 13 | 0.90 | 0.91 | 1.00 | 1.01 | Example |
| 11 | 24 | 384 | 72 | 74 | ○ | 0.90 | 0.90 | 8 | 31 | 0.90 | 0.90 | 1.00 | 1.00 | Example |
| 12 | 200 | 216 | 600 | 937 | ○ | 0.88 | 0.88 | 6 | 14 | 0.88 | 0.89 | 1.00 | 1.01 | Example |
| 13 | 200 | 144 | 600 | 1545 | ○ | 0.89 | 0.89 | 6 | 13 | 0.89 | 0.89 | 1.00 | 1.00 | Example |
| 14 | 200 | 72 | 600 | 2585 | ○ | 0.89 | 0.89 | 6 | 12 | 0.89 | 0.89 | 1.00 | 1.00 | Example |
| 15 | 200 | 48 | 600 | 3193 | ○ | 0.92 | 0.92 | 6 | 11 | 0.93 | 0.93 | 1.01 | 1.01 | Example |
| 16 | 200 | 12 | 600 | 5273 | ○ | 0.93 | 0.93 | 6 | 11 | 0.93 | 0.94 | 1.00 | 1.01 | Example |
| 17 | 1200 | 12 | 3600 | 5273 | ○ | 0.89 | 0.89 | 6 | 12 | 0.89 | 0.91 | 1.00 | 1.02 | Example |
| 18 | 1200 | 18 | 3600 | 4664 | ○ | 0.90 | 0.90 | 6 | 12 | 0.90 | 0.92 | 1.00 | 1.02 | Example |
| 19 | 1200 | 24 | 3600 | 4233 | ○ | 0.89 | 0.89 | 6 | 13 | 0.89 | 0.91 | 1.00 | 1.02 | Example |
| 20 | 1000 | 12 | 3000 | 5273 | ○ | 0.89 | 0.90 | 6 | 11 | 0.90 | 0.90 | 1.01 | 1.00 | Example |
| 21 | 1000 | 24 | 3000 | 4233 | ○ | 0.92 | 0.92 | 6 | 12 | 0.92 | 0.92 | 1.00 | 1.00 | Example |
| 22 | 1000 | 36 | 3000 | 3625 | ○ | 0.91 | 0.91 | 6 | 13 | 0.91 | 0.92 | 1.00 | 1.01 | Example |
| 23 | 800 | 12 | 2400 | 5273 | ○ | 0.89 | 0.89 | 6 | 11 | 0.89 | 0.91 | 1.00 | 1.02 | Example |
| 24 | 800 | 24 | 2400 | 4233 | ○ | 0.88 | 0.88 | 6 | 12 | 0.89 | 0.90 | 1.01 | 1.02 | Example |
| 25 | 700 | 48 | 2100 | 3193 | ○ | 0.89 | 0.89 | 6 | 12 | 0.89 | 0.89 | 1.00 | 1.00 | Example |
| 26 | 800 | 48 | 2400 | 3193 | ○ | 0.92 | 0.92 | 6 | 13 | 0.92 | 0.94 | 1.00 | 1.02 | Example |
| 27 | 500 | 12 | 1500 | 5273 | ○ | 0.91 | 0.91 | 6 | 11 | 0.91 | 0.93 | 1.00 | 1.02 | Example |
| 28 | 500 | 36 | 1500 | 3625 | ○ | 0.92 | 0.92 | 6 | 11 | 0.92 | 0.94 | 1.00 | 1.02 | Example |
| 29 | 500 | 72 | 1500 | 2585 | ○ | 0.91 | 0.91 | 6 | 12 | 0.92 | 0.93 | 1.01 | 1.02 | Example |
| 30 | 500 | 96 | 1500 | 2153 | ○ | 0.92 | 0.93 | 6 | 13 | 0.92 | 0.94 | 1.00 | 1.01 | Example |
| 31 | 300 | 12 | 900 | 5273 | ○ | 0.92 | 0.92 | 6 | 11 | 0.92 | 0.92 | 1.00 | 1.00 | Example |
| 32 | 300 | 36 | 900 | 3625 | ○ | 0.90 | 0.90 | 6 | 11 | 0.90 | 0.90 | 1.00 | 1.00 | Example |
| 33 | 300 | 108 | 900 | 1977 | ○ | 0.88 | 0.88 | 6 | 12 | 0.88 | 0.88 | 1.00 | 1.00 | Example |
| 34 | 300 | 156 | 900 | 1425 | ○ | 0.92 | 0.92 | 6 | 14 | 0.92 | 0.94 | 1.00 | 1.02 | Example |
| 35 | 1200 | 48 | 3600 | 3193 | x | 0.91 | 0.91 | 10 | 55 | 0.91 | 1.27 | 1.00 | 1.40 | Comparative Example |
| 36 | 1000 | 72 | 3000 | 2585 | x | 0.89 | 0.89 | 10 | 55 | 0.89 | 1.31 | 1.00 | 1.47 | Comparative Example |
| 37 | 850 | 96 | 2550 | 2153 | x | 0.90 | 0.90 | 10 | 55 | 0.90 | 1.39 | 1.00 | 1.54 | Comparative Example |
| 38 | 650 | 144 | 1950 | 1545 | x | 0.91 | 0.91 | 10 | 55 | 0.91 | 1.39 | 1.00 | 1.53 | Comparative Example |
| 39 | 500 | 204 | 1500 | 1023 | x | 0.92 | 0.92 | 10 | 57 | 0.92 | 1.37 | 1.00 | 1.49 | Comparative Example |
| 40 | 350 | 252 | 1050 | 706 | x | 0.88 | 0.88 | 10 | 53 | 0.88 | 1.20 | 1.00 | 1.36 | Comparative Example |
| 41 | 250 | 312 | 750 | 385 | x | 0.92 | 0.92 | 10 | 54 | 0.92 | 1.31 | 1.00 | 1.42 | Comparative Example |
| 42 | 100 | 384 | 300 | 74 | x | 0.89 | 0.90 | 9 | 49 | 0.90 | 1.37 | 1.01 | 1.52 | Comparative Example |
| 43 | 1200 | 72 | 3600 | 2585 | x | 0.91 | 0.91 | 11 | 65 | 0.91 | 1.23 | 1.00 | 1.35 | Comparative Example |
| 44 | 1200 | 96 | 3600 | 2153 | x | 0.91 | 0.91 | 11 | 69 | 0.91 | 1.33 | 1.00 | 1.46 | Comparative Example |
| 45 | 1200 | 144 | 3600 | 1545 | x | 0.89 | 0.89 | 12 | 74 | 0.89 | 1.29 | 1.00 | 1.45 | Comparative Example |
| 46 | 1200 | 252 | 3600 | 706 | x | 0.91 | 0.91 | 12 | 79 | 0.91 | 1.42 | 1.00 | 1.56 | Comparative Example |
| 47 | 1000 | 96 | 3000 | 2153 | x | 0.91 | 0.92 | 11 | 63 | 0.91 | 1.25 | 1.00 | 1.36 | Comparative Example |
| 48 | 1000 | 144 | 3000 | 1545 | x | 0.92 | 0.92 | 11 | 69 | 0.92 | 1.40 | 1.00 | 1.52 | Comparative Example |
| 49 | 1000 | 252 | 3000 | 706 | x | 0.88 | 0.88 | 12 | 76 | 0.88 | 1.28 | 1.00 | 1.45 | Comparative Example |
| 50 | 850 | 144 | 2550 | 1545 | x | 0.89 | 0.89 | 11 | 65 | 0.89 | 1.30 | 1.00 | 1.46 | Comparative Example |
| 51 | 850 | 252 | 2550 | 706 | x | 0.89 | 0.89 | 12 | 72 | 0.89 | 1.34 | 1.00 | 1.51 | Comparative Example |
| 52 | 650 | 252 | 1950 | 706 | x | 0.91 | 0.91 | 11 | 67 | 0.91 | 1.36 | 1.00 | 1.49 | Comparative Example |
| 53 | 250 | 384 | 750 | 74 | x | 0.89 | 0.89 | 11 | 60 | 0.89 | 1.37 | 1.00 | 1.54 | Comparative Example |
| 54 | 500 | 384 | 1500 | 74 | x | 0.92 | 0.93 | 11 | 69 | 0.93 | 1.31 | 1.01 | 1.41 | Comparative Example |

*○: satisfying formula (1), x: not satisfying formula (1)

As listed in Table 1, all Examples had excellent uniformity of magnetic properties in the sheet transverse direction. In each Example, the carbon content of steel substrate at the coil edge was suppressed to less than 40 mass ppm. Furthermore, all Examples had good coating appearance.

On the other hand, in the comparative examples, sufficient uniformity of magnetic properties in the sheet transverse direction could not be obtained.

Example 2

A steel slab containing, in mass %, C: 0.0100%, Si: 2.00%, Mn: 0.07%, S: 0.015%, Sb: 0.015%, and Cr: 0.03% with the balance being Fe and inevitable impurities, was heated with a slab heating temperature of 1350° C. and a holding time of 40 minutes. The steel slab was then hot rolled to obtain hot-rolled steel sheets with a thickness of 2.6 mm. The resulting hot-rolled steel sheets were then subjected to hot-rolled sheet annealing with an annealing temperature of 900° ° C. and an annealing time of 60 seconds. Then, the hot-rolled steel sheets were subjected to cold rolling with intermediate annealing with an annealing temperature of 1050° C. and annealing time of 60 seconds to obtain cold-rolled steel sheets with a thickness (final sheet thickness) of 0.30 mm. The chemical composition of the prepared cold-rolled steel sheets was the same as that of the steel slab above.

The prepared cold-rolled steel sheets were subjected to decarburization annealing, which also serves as primary recrystallization annealing, under a wet hydrogen atmosphere of 60 vol % hydrogen-40 vol % nitrogen and a dew point of 55° C., with an annealing temperature of 840° C. and an annealing time of 60 seconds. The average heating rate from room temperature to 820° C. was 700° C./s. The carbon content of the steel substrate of each of the cold-rolled steel sheets after decarburization annealing was 4 mass ppm.

Then, a MgO-based annealing separator, specifically, obtained by mixing 3 parts by mass of $TiO_2$ with respect to 100 parts by mass of MgO, was made into a water slurry and hydrated at the temperatures listed in Table 2 for 1.0 hours. Then, the annealing separator was applied to each of the cold-rolled steel sheets after decarburization annealing, so that the coating amount of the annealing separator after drying was 6.5 g/m$^2$ per side of the steel sheet. The annealing separator was then dried with the drying temperatures listed in Table 2 and a drying time of 1 minute.

The cold-rolled steel sheets were then coiled and stored for a certain period of time under the conditions listed in Table 2. The value of the ignition loss of the annealing separator after drying: IGLOSS (mass %) was measured by the method described above. The measurement results are also listed in Table 2. The carbon dioxide concentration in the storage environment of the cold-rolled steel sheet: A was controlled by the method described above.

The cold-rolled steel sheets were then subjected to final annealing with an annealing temperature of 1200° C. and an annealing time of 5 hours. The heating time from 300° C. to 700° ° C. was 100 hours, and the average heating rate from 700° ° C. to 1200° ° C. was 20° C./hr. After the final annealing, unreacted annealing separator was removed with a brush. The cold-rolled steel sheets were then subjected to flattening annealing in a non-oxidizing atmosphere containing 98 vol % nitrogen with the balance being hydrogen at an annealing temperature of 820° C. and an annealing time of 30 seconds to obtain grain-oriented electrical steel sheets as the final product.

Further, in the same manner as in Example 1, samples of length: 300×width (in sheet transverse direction): 100 mm were taken from the center portion (center portion in the sheet transverse direction) of the coil and from the coil edge, respectively to measure the magnetic aging of the obtained grain-oriented electrical steel sheets The results are also listed in Table 2. The evaluation criteria are the same as in Example 1. The $W_{17/50}$ values of the samples taken from the center portion (center portion in the sheet transverse direction) of the coil before stress relief annealing and from the coil edge were all in the range of 1.10 to 1.20 W/kg. In addition, the $B_8$ values of the samples taken from the center portion (center portion in the sheet transverse direction) of the coil before stress relief annealing and from the coil edge were all in the range of 1.865 to 1.875 T.

TABLE 2

| No. | Application•Drying Conditions: Hydration temperature (° C.) | Application•Drying Conditions: Drying temperature (° C.) | Storing Conditions: IGLOSS (mass %) | Storing Conditions: A (mass ppm) | Storing Conditions: T (hr) | Storing Conditions: A × IGLOSS | Storing Conditions: −1500 × Ln(T) + 9000 | Storing Conditions: Formula (1)* | Before Stress Relief Annealing Iron loss (W/kg): Center portion | Before Stress Relief Annealing Iron loss (W/kg): Edge |
|---|---|---|---|---|---|---|---|---|---|---|
| 1 | 5 | 150 | 1.5 | 200 | 264 | 300 | 636 | ○ | 1.10 | 1.10 |
| 2 | 5 | 200 | 1.5 | 300 | 216 | 450 | 937 | ○ | 1.10 | 1.10 |
| 3 | 5 | 250 | 1.5 | 400 | 264 | 600 | 636 | ○ | 1.16 | 1.17 |
| 4 | 10 | 200 | 1.8 | 1000 | 48 | 1800 | 3193 | ○ | 1.18 | 1.19 |
| 5 | 10 | 300 | 1.8 | 800 | 72 | 1440 | 2585 | ○ | 1.19 | 1.20 |
| 6 | 10 | 350 | 1.5 | 700 | 96 | 1050 | 2153 | ○ | 1.16 | 1.16 |
| 7 | 10 | 400 | 1.3 | 1200 | 36 | 1560 | 3625 | ○ | 1.18 | 1.18 |
| 8 | 15 | 200 | 2.5 | 100 | 312 | 250 | 385 | ○ | 1.14 | 1.15 |
| 9 | 15 | 300 | 2.5 | 150 | 200 | 375 | 1053 | ○ | 1.15 | 1.16 |
| 10 | 15 | 400 | 2.0 | 24 | 384 | 48 | 74 | ○ | 1.13 | 1.14 |
| 11 | 15 | 450 | 1.8 | 200 | 216 | 360 | 937 | ○ | 1.19 | 1.20 |
| 12 | 20 | 200 | 3.0 | 200 | 144 | 600 | 1545 | ○ | 1.13 | 1.12 |
| 13 | 20 | 300 | 3.0 | 200 | 72 | 600 | 2585 | ○ | 1.12 | 1.11 |
| 14 | 20 | 350 | 2.8 | 200 | 48 | 560 | 3193 | ○ | 1.19 | 1.19 |
| 15 | 20 | 400 | 2.5 | 200 | 12 | 500 | 5273 | ○ | 1.12 | 1.12 |
| 16 | 20 | 450 | 2.2 | 1200 | 12 | 2640 | 5273 | ○ | 1.15 | 1.15 |
| 17 | 30 | 350 | 4.0 | 1000 | 12 | 4000 | 5273 | ○ | 1.10 | 1.10 |
| 18 | 30 | 400 | 3.0 | 1000 | 24 | 3000 | 4233 | ○ | 1.11 | 1.11 |
| 19 | 40 | 450 | 2.5 | 1000 | 36 | 2500 | 3625 | ○ | 1.18 | 1.19 |
| 20 | 40 | 300 | 8.0 | 800 | 4 | 6400 | 6921 | ○ | 1.10 | 1.11 |

TABLE 2-continued

| | | | | | | | | | | |
|---|---|---|---|---|---|---|---|---|---|---|
| 21 | 40 | 450 | 3.2 | 500 | 12 | 1600 | 5273 | ○ | 1.11 | 1.12 |
| 22 | 5 | 250 | 1.5 | 500 | 264 | 750 | 636 | x | 1.16 | 1.16 |
| 23 | 10 | 400 | 1.3 | 1000 | 180 | 1300 | 1211 | x | 1.16 | 1.17 |
| 24 | 15 | 350 | 2.3 | 400 | 250 | 920 | 718 | x | 1.15 | 1.14 |
| 25 | 15 | 400 | 2.0 | 400 | 264 | 800 | 636 | x | 1.18 | 1.17 |
| 26 | 20 | 450 | 2.2 | 800 | 216 | 1760 | 937 | x | 1.19 | 1.19 |
| 27 | 30 | 200 | 5.0 | 1200 | 18 | 6000 | 4664 | x | 1.18 | 1.18 |
| 28 | 30 | 300 | 5.0 | 1200 | 24 | 6000 | 4233 | x | 1.10 | 1.10 |
| 29 | 30 | 350 | 4.0 | 600 | 96 | 2400 | 2153 | x | 1.15 | 1.15 |
| 30 | 40 | 200 | 8.0 | 800 | 12 | 6400 | 5273 | x | 1.18 | 1.18 |
| 31 | 40 | 300 | 8.0 | 800 | 24 | 6400 | 4233 | x | 1.18 | 1.19 |
| 32 | 40 | 350 | 6.0 | 700 | 48 | 4200 | 3193 | x | 1.20 | 1.20 |
| 33 | 40 | 400 | 4.1 | 800 | 48 | 3280 | 3193 | x | 1.18 | 1.18 |

| | After Stress Relief Annealing | | | | | | |
|---|---|---|---|---|---|---|---|
| | Carbon content (mass ppm) | | Iron loss (W/kg) | | Ratio of Iron Loss | | |
| No. | Center portion | Edge | Center portion | Edge | Center portion | Edge | Remarks |
| 1 | 6 | 14 | 1.10 | 1.11 | 1.00 | 1.01 | Example |
| 2 | 6 | 14 | 1.10 | 1.10 | 1.00 | 1.00 | Example |
| 3 | 6 | 20 | 1.16 | 1.18 | 1.00 | 1.01 | Example |
| 4 | 6 | 12 | 1.18 | 1.19 | 1.00 | 1.00 | Example |
| 5 | 6 | 12 | 1.20 | 1.21 | 1.01 | 1.01 | Example |
| 6 | 6 | 12 | 1.16 | 1.16 | 1.00 | 1.00 | Example |
| 7 | 6 | 12 | 1.18 | 1.19 | 1.00 | 1.01 | Example |
| 8 | 6 | 16 | 1.14 | 1.16 | 1.00 | 1.01 | Example |
| 9 | 6 | 13 | 1.15 | 1.16 | 1.00 | 1.00 | Example |
| 10 | 7 | 21 | 1.13 | 1.14 | 1.00 | 1.00 | Example |
| 11 | 6 | 13 | 1.20 | 1.20 | 1.01 | 1.00 | Example |
| 12 | 6 | 13 | 1.13 | 1.13 | 1.00 | 1.01 | Example |
| 13 | 6 | 12 | 1.12 | 1.13 | 1.00 | 1.02 | Example |
| 14 | 6 | 11 | 1.19 | 1.19 | 1.00 | 1.00 | Example |
| 15 | 6 | 11 | 1.12 | 1.13 | 1.00 | 1.01 | Example |
| 16 | 6 | 11 | 1.15 | 1.16 | 1.00 | 1.01 | Example |
| 17 | 6 | 12 | 1.11 | 1.12 | 1.01 | 1.02 | Example |
| 18 | 6 | 12 | 1.11 | 1.12 | 1.00 | 1.01 | Example |
| 19 | 6 | 12 | 1.18 | 1.19 | 1.00 | 1.00 | Example |
| 20 | 6 | 14 | 1.10 | 1.12 | 1.00 | 1.01 | Example |
| 21 | 6 | 11 | 1.11 | 1.13 | 1.00 | 1.01 | Example |
| 22 | 10 | 44 | 1.16 | 1.67 | 1.00 | 1.44 | Comparative Example |
| 23 | 10 | 42 | 1.16 | 1.69 | 1.00 | 1.44 | Comparative Example |
| 24 | 11 | 48 | 1.15 | 1.74 | 1.00 | 1.53 | Comparative Example |
| 25 | 11 | 47 | 1.18 | 1.73 | 1.00 | 1.48 | Comparative Example |
| 26 | 13 | 62 | 1.19 | 1.77 | 1.00 | 1.49 | Comparative Example |
| 27 | 13 | 68 | 1.18 | 1.66 | 1.00 | 1.41 | Comparative Example |
| 28 | 14 | 72 | 1.10 | 1.70 | 1.00 | 1.55 | Comparative Example |
| 29 | 11 | 50 | 1.16 | 1.63 | 1.01 | 1.42 | Comparative Example |
| 30 | 13 | 66 | 1.18 | 1.73 | 1.00 | 1.47 | Comparative Example |
| 31 | 14 | 75 | 1.18 | 1.81 | 1.00 | 1.52 | Comparative Example |
| 32 | 13 | 65 | 1.20 | 1.74 | 1.00 | 1.45 | Comparative Example |
| 33 | 10 | 42 | 1.19 | 1.78 | 1.01 | 1.51 | Comparative Example |

*○: satisfying formula (1), x: not satisfying formula (1)

As listed in Table 2, all Examples had excellent uniformity of magnetic properties in the sheet transverse direction. In each Example, the carbon content of steel substrate at the coil edge was suppressed to less than 40 mass ppm. Furthermore, all Examples had good coating appearance.

On the other hand, in the comparative examples, sufficient uniformity of magnetic properties in the sheet transverse direction could not be obtained.

The invention claimed is:

1. A method for manufacturing a grain-oriented electrical steel sheet, comprising preparing a cold-rolled steel sheet having a chemical composition containing C: 0.0100 mass % or more and Si: 1.0 mass % or more, subjecting the cold-rolled steel sheet to decarburization annealing, applying a MgO-based annealing separator to a surface of the cold-rolled steel sheet and drying the annealing separator, coiling the cold-rolled steel sheet and then storing the cold-rolled steel sheet, and subjecting the cold-rolled steel sheet to final annealing, wherein an ignition loss of the annealing separator after drying: IGLOSS (mass %), a storage time of the cold-rolled steel sheet: T (hr), and a carbon dioxide concentration in a storage environment of the cold-rolled steel sheet: A (mass ppm) satisfy the following formula (1):

$$A \times IGLOSS \leq -1500 \times \mathrm{Ln}(T) + 9000, \quad (1)$$

and wherein IGLOSS is 1.3 mass % or more and 8.0 mass % or less, T is 4 hr or more and 384 hr or less, and A is 24 mass ppm or more and 1200 mass ppm or less.

2. The method according to claim 1, wherein during drying the annealing separator, IGLOSS is adjusted to satisfy the Formula (1), and during storing the cold-rolled steel sheet, T and A are adjusted to satisfy the Formula (1).

3. The method according to claim 1, wherein a ratio of iron loss after stress relief annealing to iron loss before stress relief annealing in a coil edge of the grain-oriented electrical steel sheet is 1.05 or less.

4. The method according to claim 2, wherein a ratio of iron loss after stress relief annealing to iron loss before stress relief annealing in a coil edge of the grain-oriented electrical steel sheet is 1.05 or less.

5. The method according to claim 3, wherein the ratio is 1.00 to 1.02.

6. The method according to claim 4, wherein the ratio is 1.00 to 1.02.

7. The method according to claim 1, wherein an iron loss after stress relief annealing in a coil edge of the grain-oriented electrical steel sheet is 0.88 to 1.21 W/kg.

* * * * *